June 24, 1924.
L. L. HOPKINS
1,498,874
CONVERTIBLE AUTOMOBILE BODY
Filed July 29, 1920
4 Sheets-Sheet 1
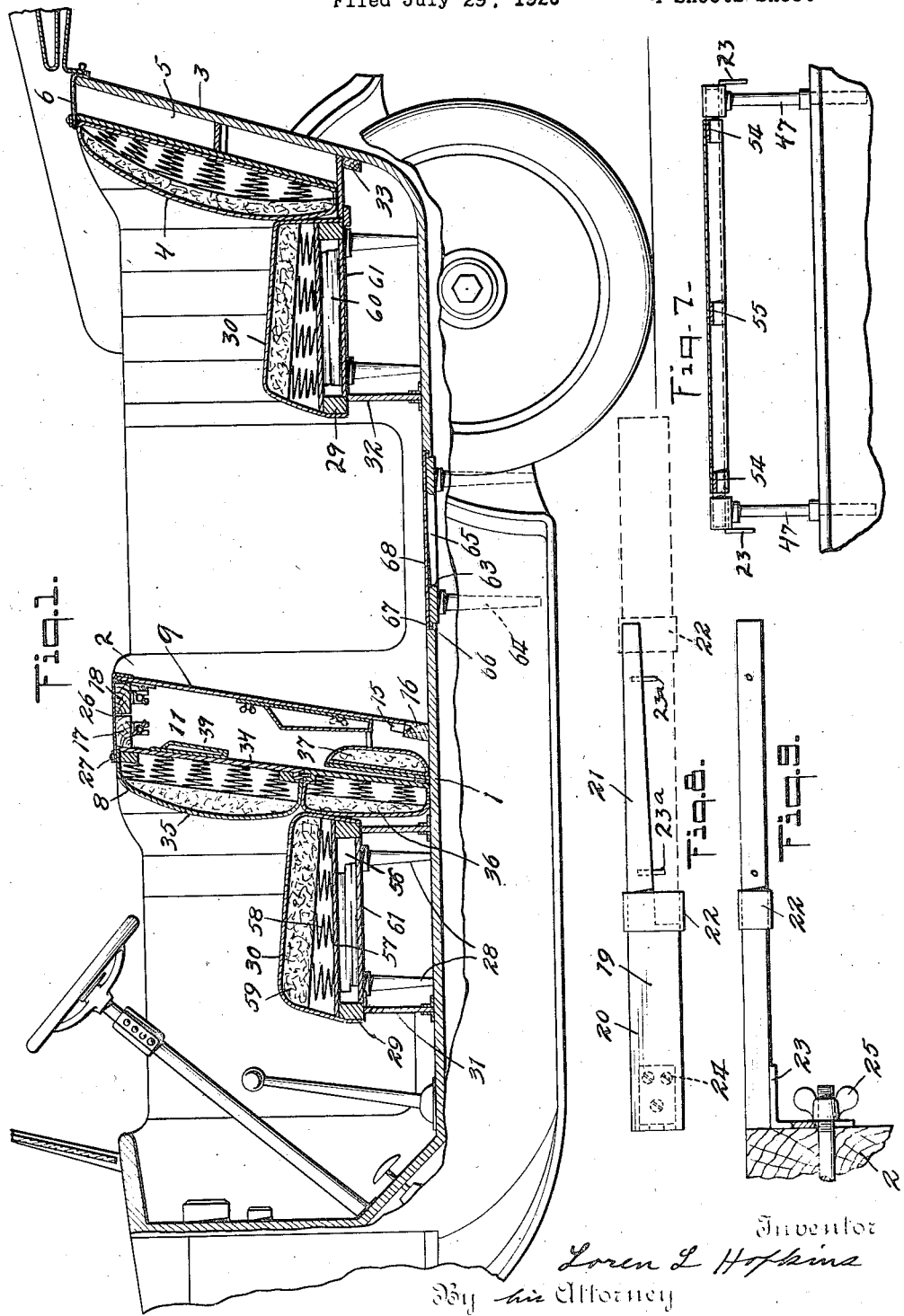
Inventor
Loren L. Hopkins
By his Attorney

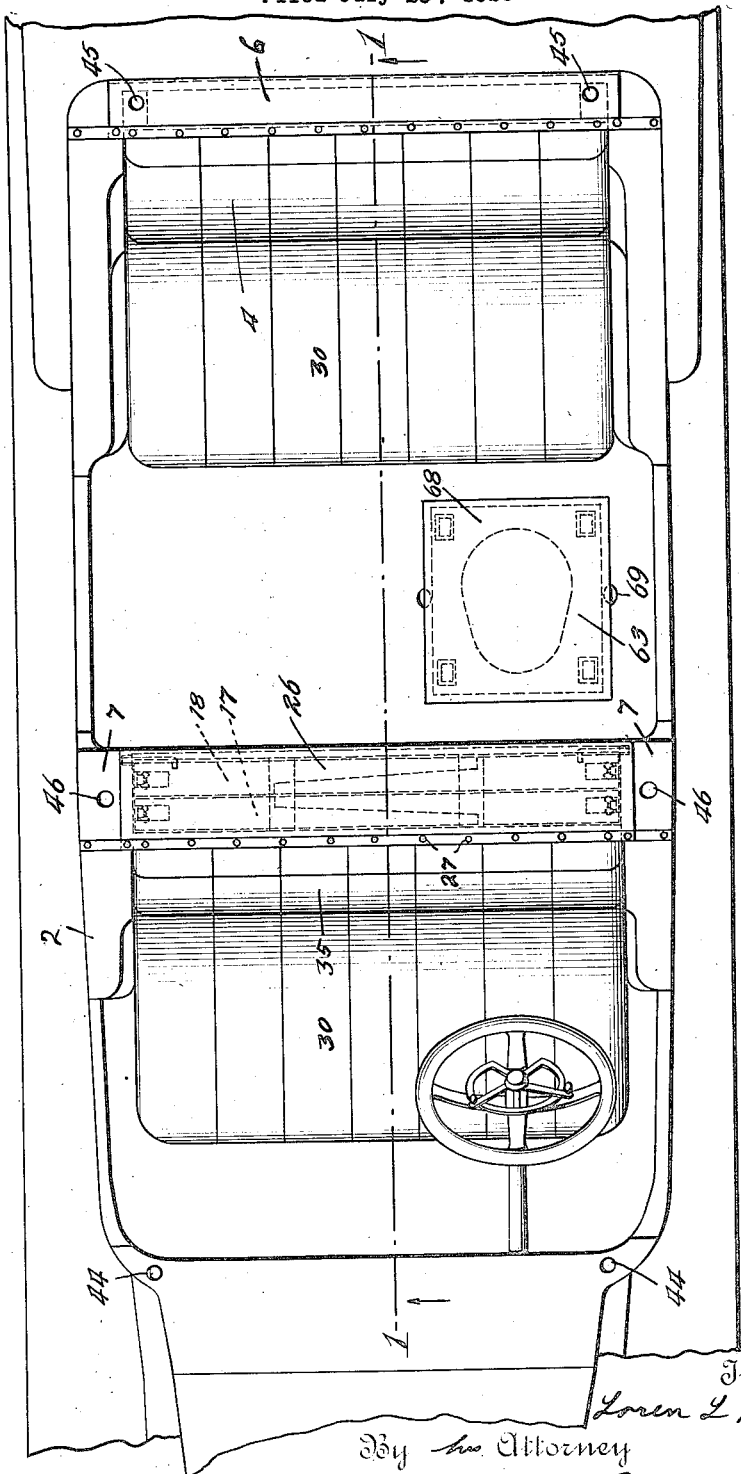

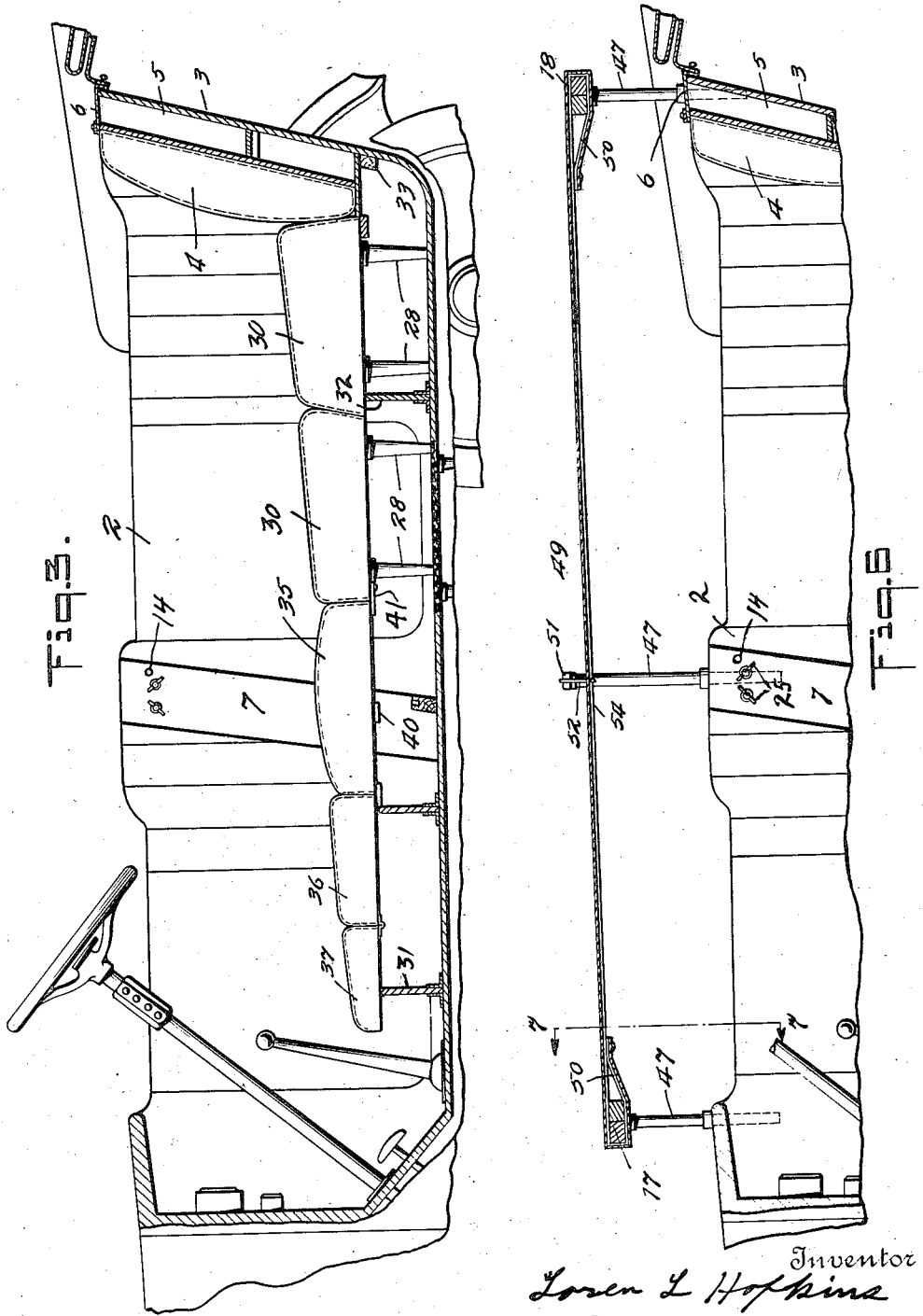

June 24, 1924.
L. L. HOPKINS
CONVERTIBLE AUTOMOBILE BODY
Filed July 29, 1920
1,498,874
4 Sheets-Sheet 4
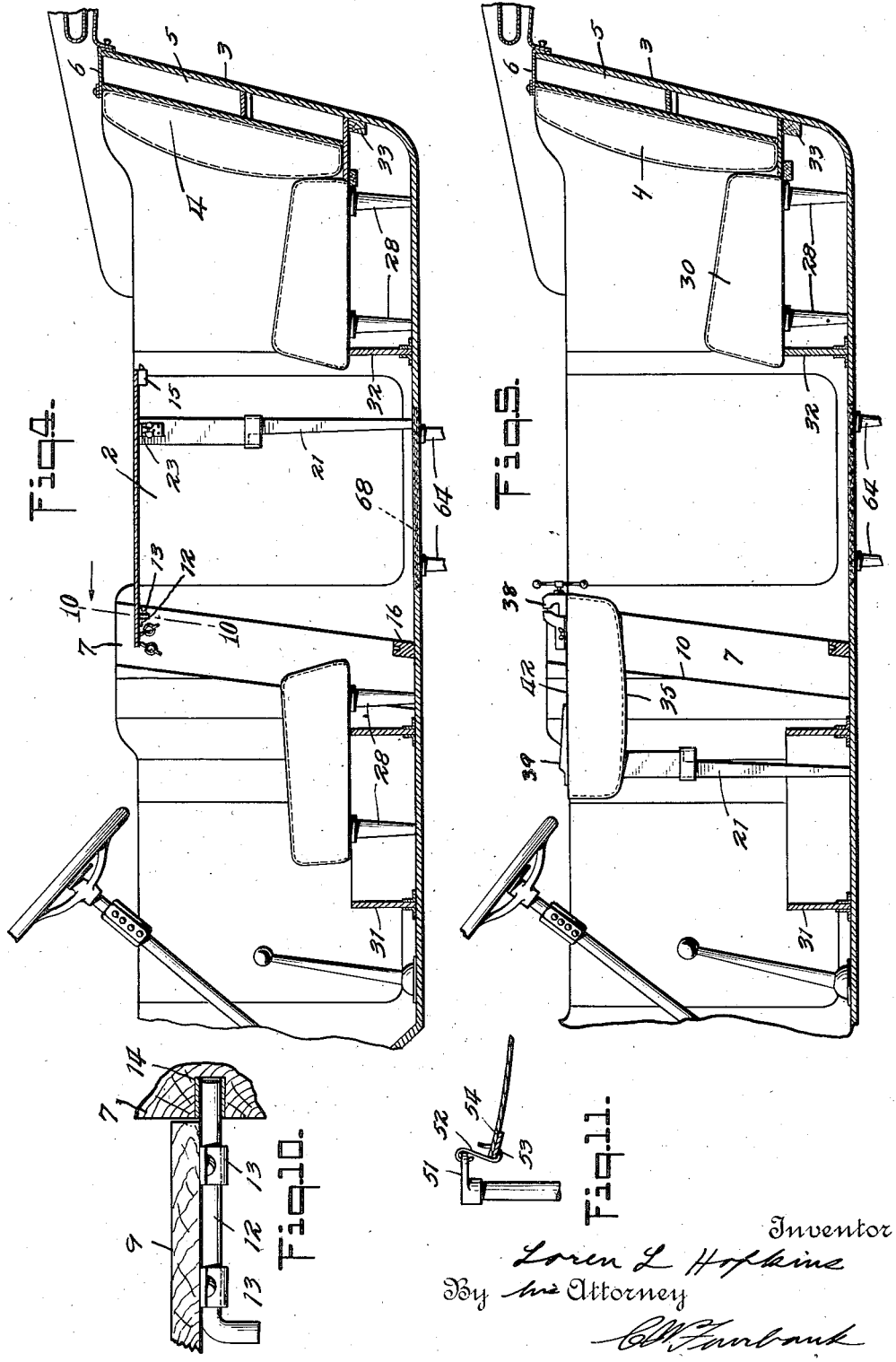

Patented June 24, 1924.

1,498,874

UNITED STATES PATENT OFFICE.

LOREN L. HOPKINS, OF BROOKLYN, NEW YORK.

CONVERTIBLE AUTOMOBILE BODY.

Application filed July 29, 1920. Serial No. 399,866.

*To all whom it may concern:*

Be it known that I, LOREN L. HOPKINS, a citizen of the United States, and a resident of Brooklyn, in the county of Kings and State of New York, have invented certain new and useful Improvements in Convertible Automobile Bodies, of which the following is a specification.

This invention relates to vehicles and in its preferred application to automobiles.

An object of the invention is to provide a vehicle of usual external appearance which shall provide not only the usual comforts for travel but one or more of the primary conveniences for the home.

A further object is to so design the parts that a completed car of ordinary construction may be equipped with the improvement with comparatively few changes and at comparatively small expense.

In a preferred embodiment the invention comprises an automobile of substantially conventional appearance which shall be readily adjustable for converting the vehicle for use as a kitchen, a dining room, a work shop, a bed-chamber having one or two beds, or into any one or more of the conveniences mentioned.

Referring now to the accompanying drawings,

Fig. 1 is a longitudinal section of an automobile embodying my invention, all of the auxiliary parts being in unobtrusive positions, said section being taken on the line 1—1 of Fig. 2.

Fig. 2 is a plan view of Fig. 1,

Fig. 3 is a view similar to Fig. 1 showing the sleeping compartment adjustment.

Fig. 4 is a view similar to Fig. 1 showing the dining room adjustment,

Fig. 5 is a view similar to Fig. 1 showing the work shop adjustment.

Fig. 6 is a fragmentary view in longitudinal section showing the auxiliary bed,

Fig. 7 is a sectional view taken along the line 7—7 of Fig. 6,

Fig. 8 is a detail view of the leg member and showing in dotted lines the assembly with another leg member to constitute a bar, Fig. 9 is a side view of a bar in position across the vehicle, Fig. 10 is a sectional view taken along the line 10—10 of Fig. 4; and Fig. 11 is a detail view partly in section of an auxiliary bed securing means.

I have shown in Fig. 1 a touring car of conventional lines comprising a floor 1, side walls 2, a rear wall 3, a back cushion 4, a compartment 5 being formed between the rear of the back seat and said back wall for storing miscellaneous articles, said compartment being closed by a flap 6 preferably made of the same material as the upholstery covering. The front seat has a back or rear wall substantially in the usual position, but divided into three sections, two narrow sections 7 rigid with the side walls and a central section made up of a plurality of separable and removable parts. These parts include the back cushion 8 of the front seat and a panel 9 parallel to said back cushion and spaced therefrom. This central separable section extends across the major portion of the width of the body. The end sections 7 are shown as at right angles to the side wall but they are preferably curved forwardly at their outer edges, as in the usual car construction. The panel 9 constitutes part of the finished body surface of the car when in normal use and the spacing from cushion 8 leaves a compartment 11 for storing various articles to be referred to hereinafter.

The panel is preferably arranged so that it may be used as a table within the car and for this purpose by preference the panel is detachably secured as, for instance, by a pair of pivots near its upper end to the portions 7 which are rigid with the side walls of the body. For this purpose I have shown (referring to Fig. 10) a pair of bolts 12 which extends through guides 13 on the inner surface of the panel, the free end of each bolt projecting, when the panel is in the position shown in Fig. 1, into corresponding sockets 14 in the portions 7. The lower end of the panel is provided with a spring latch 15 or other fastening device cooperating with a stationary transverse wall or bar 16 of the vehicle.

The compartment 11 is closed at its upper end preferably by a pair of bars 17 and 18, each bar being made up of a pair of table leg members 19, each table leg comprising a portion 20 rectangular in section and of the width of the bar and a reduced portion 21. The reduced portions 21 overlap as indicated in Fig. 8 to form a single bar substantially uniform in cross-section and a pair of bands 22 encircle the leg elements at the ends of the overlapped portions to removably secure the same together, or a pair of dowel pins 23ª are used, or if desired both bands and dowels. The bars 17 and 18 rest upon brackets 23 (see Figs. 1 and 9), the latter being secured to the leg elements as at 24, nuts 25 serving to secure the same near the upper edge of the side walls. A flap 26 similar to flap 6, preferably across from the panel 9 to the back cushion 8, is secured to one or both by snap fasteners 27 or equivalent devices serving to permit ready opening or removal.

Upon opening the flap 26, removing the bars 17 and 18, and opening the latch 15, the panel 9 may be raised about its pivots 12 until the horizontal position is reached. One of the bars may be separated into its two constituent legs and the legs may be used to support the end of the panel remote from the pivot, thereby forming a table as best shown in Fig. 4. Brackets 23 and thumb nuts 25 on stud bolts serve for securing the legs to the bottom of the table top or panel, the same bracket and the same or other nuts being used as normally holding the legs in position as shown in Figs. 8 and 9. A serviceable dining table is thus formed within the vehicle. The cushion 8 may be removed and the seat may be transposed for comfortably seating the diners, as shown in Fig. 4.

By partially withdrawing the pivot bolts from the associated side walls or portions 7, the panel 9 may be entirely removed from the vehicle. It may then be used with the four leg elements derived from separating both bars 17 and 18 to form a table which may be used outside of the vehicle.

From the foregoing, it will be apparent that I have so formed the back of the front seat of the vehicle that a knock-down table either may be erected within the vehicle or apart therefrom. It will also be apparent that the parts can readily be replaced to restore the vehicle to the normal condition shown in Fig. 1.

The seat portions of the front and back seats each have a plurality of legs 28 upon which is secured the frame 29 of an upholstered seat portion 30, the upper surface of which is shown as sloping downwardly toward the back in usual manner. To prevent shifting of the said seats in use and to conceal the legs, I prefer to use the customary frame 31 which previously supported the front seat. This is secured to the bottom of the car and completely conceals the legs 28. The said frame is preferably of the same height as the legs 28 so that it assists the legs in sustaining the weight of the passenger or may normally, entirely support the seat. It will be seen that with the use of the frame 31, the seat has the usual appearance of a motor vehicle seat. The seat is, however, readily removable from the frame by simply lifting the same and serves as a convenient stool for use outside the car where the ordinary car seat not provided with legs would be uncomfortable for such purpose. The rear seat has a frame element 32 merely at its front, the rear upholstered cushion being removable and resting upon a bar 33 at the back wall of the vehicle.

The rear cushion 8 of the front seat is removably fitted between the portions 7 on the sides of the body and includes a rear wall 34 and an upholstered portion 35 forming the usual upholstered seat back. Below the latter and of somewhat less thickness and normally concealed by the seat, is a second upholstered portion 36. Hinged to the lower end of the lower portion 36 there is a third cushion 37 which is of less thickness than cushion 36. This cushion 37 is normally concealed in the compartment 11 between the rear wall 34 and the panel 9 as shown in Fig. 1.

With the construction just described, the fittings of the vehicle can readily be converted into the bed shown in Fig. 3. For this purpose the panel 9 and the bars 17 and 18 are removed in the manner made clear above, the rear seat is reversed so that the slope instead of extending downwardly toward the rear as in Fig. 1 extends downwardly toward the front of the car as in Fig. 3. The front seat is removed from the frame 31 and placed against the front of the rear seat with the slope extending downwardly toward the front of the car, the two seats thus forming substantially a continuous upper surface. The cushions 35 and 36 together with the third cushion 37 hinged thereto are removed from the position shown in Fig. 1 and these units are laid flat upon the frame 31, the rear of cushion 35 coming into contact with the forward end of the transposed front seat. By preference cleats 40 are inserted in suitable grooves in the walls midway of the edges of the cushion 35. A second cleat 41 may be disposed below the point of contact of cushion 35 with the transposed front seat serving to prevent collapse of the bed when used.

My automobile is thus readily converted into a strong and comfortable bed. The parts can obviously be readily replaced in the position shown in Fig. 1 when the vehicle is again to be used for its normal purpose.

By preference the back wall 34 of the cushion 35 also serves as a work bench which may be disposed in the position shown in Fig. 5. This bench is preferably constructed and arranged to be supported by the same pivot bolts and legs and in substantially the same manner as the panel or table 9 except that it is of lesser width and may be made of stronger and less expensive unfinished wood. The entire front seat together with the panel 9 may be removed from the vehicle when the work bench 42 is to be installed as shown in Fig. 5, the work bench extending from pivot holes 14 toward the front of the machine, thereby leaving ample room for the workman in front of the back seat. It may have a vise 38 permanently or detachably attached and a pocket 39 for books.

It will, of course, be apparent that the table shown in Fig. 4 can be disposed to extend from the pivot 12 toward the front of the machine instead of rearwardly as shown, and occupy the same position as the work bench as shown in Fig. 5. The position of the table just described is of advantage when it comes to preparing a meal or cleaning dishes after a meal.

In the top of the body, as best shown in Fig. 2, I provide a pair of openings 44 near the front of the machine, a similar pair of openings 45 near the back thereof and a third pair of openings 46 intermediate the front and back, the said pairs being symmetrically arranged with respect to the vertical, longitudinal axis of the machine. The intermediate openings 46 are shown as at a somewhat greater distance apart than the openings at the ends. Within each of these openings I can insert or mount a rod 47, the said rod serving to support an auxiliary bed which may be used in addition to the lower bed shown in Fig. 3 so that the vehicle can in effect be converted into a sleeping compartment having a lower and an upper berth. Preferably two bars 17 and 18 made up each of a pair of table legs shown in detail in Fig. 8 are mounted one pair between the posts fitted in openings 44 and the second pair between the posts fitted in openings 45. Any suitable means (not shown) is provided for removably securing the bars to the top of the posts.

A canvas bed member 49 is stretched between the bars 17 and 18 and preferably extends substantially the entire length of the vehicle as best shown in Fig. 6, the ends of the canvas having wide hems 50 through which the bars may be removably inserted. As the canvas would sag excessively when used if unsupported at the middle of its length and as a rigid bar extending transversely across the middle would be uncomfortable, the middle posts are preferably provided each with a cap 51 which may be as shown in Fig. 11. A projection 52 carried by the cap 51 may be inserted through an eye 53 preferably in a reinforced edge 54 of the canvas. To avoid concentrating the weight of the occupants of the upper berth at the center, I preferably provide a reinforcing strip 55 of stronger material than the rest of the canvas, said reinforce extending longitudinally and midway on the lower surface thereof so that if two persons occupy the upper berth each will be lodged in a trough between the center reinforcing strip 55 and a reinforce 54 at one of the outer edges. The roof of the vehicle protects both the upper and lower berths from rain.

It will be understood that the rods 47 and the canvas 49 when not in use are preferably kept in one of the compartments, as for instance, 5.

To provide convenient space for blankets, one or both of the seats are provided with a compartment 56 at the bottom thereof below the base 57 which carries the coil springs 58 and the padded cover 59. A door 61 serves to close the lower surface of said compartment. By preference the area of the door is located between the legs 28 so that the legs need not be disturbed for opening or closing the door.

By preference a toilet seat 63 having legs 64 rests within a corresponding opening 65 in the floor of the vehicle, the seat and floor opening having complementary ledges 66 and 67 so that the seat will be supported by the floor with the legs collapsible or extending therebelow. The thicknesses of the ledges are preferably so proportioned that the upper surface of the toilet seat lies somewhat below the upper surface of the floor. A cover 68 normally extends over the seat and normally conceals the same, finger holes 69 being provided in the floor to facilitate ready removal of the cover, whereupon the seat may be readily removed from the vehicle or used in the vehicle, and will by virtue of legs 64 afford the user comfort not heretofore obtainable at points remote from human habitation.

It will thus be seen that I have provided a vehicle which has substantially the usual conventional appearance of an ordinary car and which is adapted to provide substantially the comforts obtainable in small houses usually designated as bungalows.

Briefly summarizing the features of the invention, the panel 9 may be moved upwardly about its pivots 12 and two of the leg elements 19 can be used to support the end of the panel remote from the pivot, thereby making a secure dining table. As best shown in Fig. 4, the back of the front seat is removed and the front seat itself moved to proper position, thus providing dining room seats conveniently disposed on opposite sides of the table. By extending the table forwardly from the pivot, ample room is allowed between the front and back seat for the use of the table for preparation of meals or washing of dishes. The work bench 42 forming the back side of the front seat back may be placed in the position shown in Fig. 5.

The bed shown in Fig. 3 is readily made in the manner heretofore pointed out and the auxiliary bed shown in Fig. 6 can be made up in the manner heretofore described, the posts and the canvas being preferably contained in one compartment 5, the cross bars 17 and 18 being, of course, taken from their normal position shown in Fig. 1 between the front seat and the panel 9.

The panel 9 can be mounted outside the vehicle upon the four legs into which bars 17 and 18 can be separated in order to form a serviceable table and in that case it is preferable to remove the two seats from the automobile thus providing a comfortable picnic table and seats for use outside of the automobile. The manner of removing or replacing the toilet seat 63 was fully described above.

Thus for ordinary travel my invention provides a car of the usual conventional appearance, and this car is readily convertible at will into either a comfortable dining room, a kitchen, a work shop, a bed and an auxiliary bed or upper berth, and the vehicle also provides a comfortable toilet seat.

It is, of course, apparent that all of the appurtenances above described need not in every case be installed, a construction embodying any one or more of the conveniences set forth in the manner above coming within the scope of my invention.

I claim:

1. A vehicle having a seat, a back therefor, a panel in the rear of said back and spaced therefrom, and normally disposed in a substantially vertical plane and having its upper edge pivotally supported independently of the back, and means for supporting said panel in a substantially horizontal plane with its rear surface uppermost to constitute a table, said means including legs disposed between said back and said panel when the panel is in vertical position.

2. In a vehicle, in combination, a seat having a back, a panel spaced from said back and parallel thereto, and a closure element between said back and said panel and near the upper edge thereof, said closure element including removable table legs, said panel being shiftable to horizontal position to be sustained by said legs to constitute a table.

3. A vehicle, including, a seat having a transverse rear wall, a panel substantially parallel to said wall and spaced therefrom to form a compartment therebetween, a removable closure element for said compartment composed of a plurality of sectional bars, said panel being displaceable to horizontal position within said body, and some of said bar sections serving as legs to retain said panel in said position for forming a table.

4. In a vehicle body, a seat having a back, bars removably mounted transversely of the body to constitute a portion of said back each bar being composed of two table leg members having a lap fit with respect to each other, and means for removably holding said leg members together.

5. In a vehicle, in combination, a body, a seat extending the width thereof, a movable panel parallel to the back of said seat and spaced therefrom, and bars extending transversely of said body and serving as a closure element for the compartment formed between said back and said panel, said bars being composed of pairs of table leg members having overlapping ends, and means removably securing said table leg members together, whereby said panel may be moved to horizontal position within said vehicle, and sustained by a pair of said legs to constitute a table.

6. In a vehicle, in combination, a body, a seat extending the width thereof and having a back, a removable panel parallel to said back and spaced therefrom to form a compartment, and a plurality of sectional bars extending transversely of said body near the top thereof and between said back and said panel to constitute a closure for said compartment, whereby sections of said bars may serve as legs for a table, said panel serving as the top thereof.

7. In a vehicle, in combination, a body, a seat extending the width thereof, a removable panel extending the width of said body parallel to said back and spaced therefrom, a pair of bars extending in parallelism the width of said body, said bars serving jointly as a closure for said compartment, each said bar being composed of a pair of separable table leg members overlapping at their adjacent ends, whereby said panel and said bars may be assembled into a table construction.

8. In a vehicle, in combination, a body, a seat extending the width thereof and having a back, a panel extending the width of said body parallel to said back and spaced therefrom, a pair of bars extending in parallelism the width of said body, said bars serving jointly as a closure for said compartment, each said bar being composed of a pair of tapered table leg members overlapping at their adjacent ends and having connecting bands, and a closure flap extending over said bars, whereby said bars may be separated into the constituent leg elements and said panel and said legs may be assembled into a table construction.

9. In a vehicle body, in combination, a front seat having a back, a displaceable panel extending parallel to said back and substantially midway between the ends of the body, and pivot means in the sides of said body and adjacent the top thereof adapted to support one end of said panel with said panel extending either toward the front of the vehicle or toward the rear thereof, and a pair of leg elements normally disposed within the body construction adapted to sustain the end of said panel element remote from said pivot to constitute a table when said panel is placed in horizontal position.

10. In a vehicle, in combination, a body having a removable seat, a compartment to the rear of said seat, a table top normally within said compartment, and a removable closure for said compartment constituting table legs, whereby said seat may be removed, said table top may be disposed substantially in the position of said seat and sustained by said legs to serve as a convenient work bench and spaced from said front seat to allow room for the worker.

11. A vehicle comprising in combination, a back seat, a front seat, the latter having an upholstered back extending substantially to the floor, the upper portion of which constitutes a back rest, and an auxiliary upholstered portion hinged to the bottom of said back and extending upwardly therefrom, means concealing said upwardly extending upholstered portion in normal position of the vehicle, and means for sustaining said back when extended into horizontal position to form in conjunction with said back seat and said front seat a bed.

12. A vehicle comprising in combination, a back seat, a front seat, said front seat comprising a removable upholstered seat portion having legs, a supporting frame upon the floor of said vehicle normally sustaining said seat portion, said front seat having an upholstered back, a wall to the rear of said back, upholstered elements normally concealed between said front seat and said wall, whereby said front seat may be removed and placed in front of said back seat and be sustained by legs thereof, and said upholstered sections may be supported at one end by said frame, and means to sustain the portions of said upholstered section disposed between said frame and the front of the transposed back seat to constitute a bed.

Signed at New York, in the county of New York and State of N. Y., this 26th day of July, A. D. 1920.

LOREN L. HOPKINS.